US006957325B1

(12) United States Patent
Chang et al.

(10) Patent No.: US 6,957,325 B1
(45) Date of Patent: Oct. 18, 2005

(54) SYSTEM AND METHOD FOR DETECTING PROGRAM HAZARDS IN PROCESSORS WITH UNPROTECTED PIPELINES

(75) Inventors: En-Shou Chang, Irvine, CA (US); Rajat Mathur, Irvine, CA (US); Charles P. Siska, Costa Mesa, CA (US); Chao Xu, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 444 days.

(21) Appl. No.: 10/188,247

(22) Filed: Jul. 1, 2002

(51) Int. Cl.$^7$ ............................................. G06F 11/00
(52) U.S. Cl. ..................... 712/226; 712/229; 717/127
(58) Field of Search ....................... 711/140; 712/226, 712/229; 717/127

(56) References Cited

U.S. PATENT DOCUMENTS

| | | | |
|---|---|---|---|
| 6,014,513 A | 1/2000 | Voelker et al. ............. 395/703 |
| 6,071,317 A | 6/2000 | Nagel ............................. 717/4 |
| 6,083,278 A | 7/2000 | Olson et al. .................... 717/2 |
| 6,161,200 A | 12/2000 | Rees et al. ..................... 714/38 |
| 6,173,440 B1 | 1/2001 | Darty ............................. 717/4 |
| 6,237,139 B1 | 5/2001 | Hotta et al. .................... 717/4 |
| 6,308,316 B1 | 10/2001 | Hashimoto et al. ............ 717/4 |
| 6,629,238 B1 * | 9/2003 | Arora et al. ................. 712/241 |

* cited by examiner

*Primary Examiner*—Pierre M. Vital
*Assistant Examiner*—Midys Inoa
(74) *Attorney, Agent, or Firm*—Tejinder Singh; Klein, O'Neill & Singh, LLP

(57) ABSTRACT

A process and system for analyzing executable portion of computer code for processors with unprotected pipelines is provided. The process assumes a worst set of current processor states; analyzes plural control paths for possible hazards by computing an induced set of processor states after executing a computer instruction; and adjusts the worst set of current processor states based on program annotations to the computer instruction.

12 Claims, 4 Drawing Sheets

SYSTEM AND METHOD FOR DETECTING PROGRAM HAZARDS IN PROCESSORS WITH UNPROTECTED PIPELINES

BACKGROUND OF THE INVENTION

1. Field of the Invention

The present invention relates to processors, and more particularly, to detecting program hazards in processors with unprotected pipelines.

2. Background

Computer applications today incorporate complex mathematical operations that are performance critical. Many image and speech processing applications perform complex mathematical functions, for example, filtering in real time. Typically, such applications use a digital signal processor (DSP) that implements instructions useful and efficient in digital signal processing. An example of a DSP is the TMS320 series of DSPs available from Texas Instruments®. Various DSPs and other embedded chips are also provided by Conexant Inc.®.

To meet stringent power and performance objectives, the DSPs are often designed with "open" or "unprotected" pipelines. Such unprotected pipelines produce unpredictable results (referred to herein as "hazards" and include static stalls) when computer-executable code is executed by a DSP (or any other processor that is designed with such unprotected pipelines). This is in contrast to most desktop personal computer processors (e.g. the Pentium® class processor from Intel Corp.) that use extra circuitry to protect from such hazards.

Hazards may be grouped into two categories, static and dynamic. Static hazards involve program sequences, while dynamic (or run-time) hazards involve actual data values.

Software (or firmware) programmers use assembly language to write programs. Such programs must avoid program sequences that may result in hazards. Typically, the list of program sequence instructions can be very long and complex. One must analyze every line of code to avoid hazards, which can be very tedious and expensive.

One conventional technique to avoid hazards has been program simulation. Simulation can detect hazards along specific paths of data sets provided to the simulated program. However, exhaustive checking of all combinations of possible executable paths with all possible data values is tedious and expensive, and is not acceptable as a viable commercial solution.

Therefore, there is a need for a system and method that allows programmers to evaluate program sequences and avoid hazards, both static and dynamic, in processors with unprotected pipelines.

SUMMARY OF THE INVENTION

In one aspect, the present invention addresses the foregoing drawbacks and provides a process for analyzing executable portion of computer code for processors with unprotected pipelines. The process assumes a worst set of current processor states; analyzes plural control paths for possible hazards by computing an induced set of processor states after executing computer instructions; and adjusts the worst set of current processor states based on program annotations to the computer instruction.

The process also determines whether the adjusted set of current machine states is within a previously determined set of processor states; and updates the computed induced set of processor states associated with the instruction, if the adjusted set of current processor states is different from the previously determined set of processor states.

In another aspect of the present invention, a system is provided for analyzing executable portion of computer code. The system includes a processor that analyzes plural control paths for possible hazards. The processor computes an induced set of processor states after analyzing computer instructions; and adjusts the set of current processor states based on program annotations.

The processor also determines if the adjusted set of current machine states is within a previously determined set of processor states; and updates the computed induced set of processor states associated with the instruction, if the adjusted set of current processor states is different from the previously determined set of processor states. The processor uses the computed set of processor states for determining hazards in the next computer instruction.

In one aspect of the present invention, simulation is not required and every possible executable branch is analyzed for hazards and stalls.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

In one aspect of the present invention a system and process is provided that detects program hazards in processors with unprotected pipelines without cumbersome and expensive simulation. The process selects an entry address for executable computer code and performs a depth first analysis, as described below. It is noteworthy that the adaptive aspects of the present invention are not limited to a depth first search; other analysis techniques for program code traversal may be used to detect program hazards.

The process evaluates the executable portion of computer code (.exe file) and analyzes plural control paths. The process determines potential program states by analyzing instructions in the executable code and using programmer annotations.

To facilitate an understanding of the preferred embodiment, the general architecture and operation of a computing system will be described first. The specific process under the preferred embodiment will then be described with reference to the general architecture.

Figure 1A:
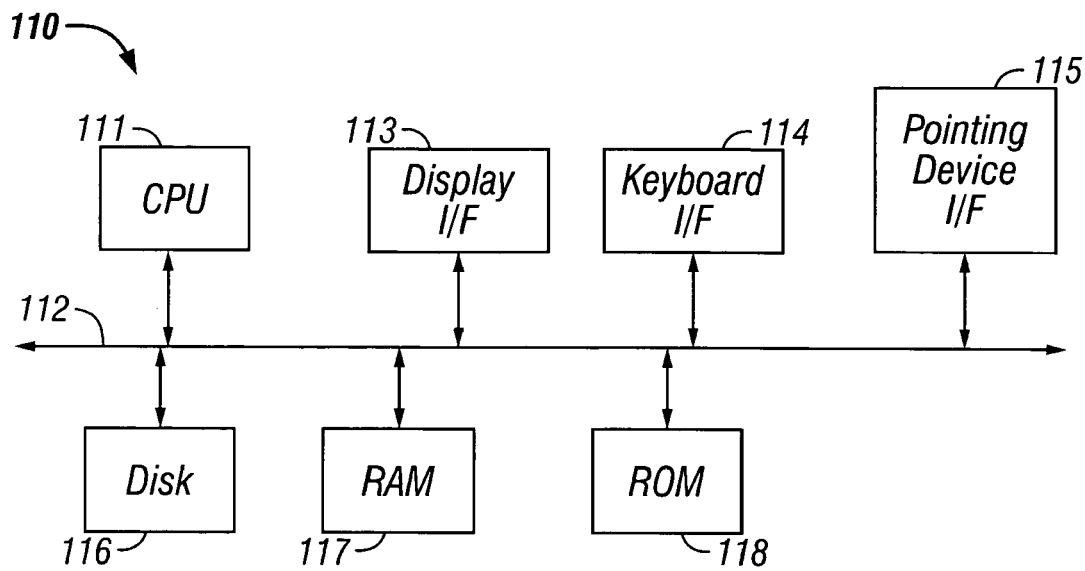
FIG. 1A is a block diagram of a system used for detecting program hazards in processors with unprotected pipelines, according to one aspect of the present invention.

FIG. 1A is a block diagram showing the internal functional architecture of a computing system 110 that may be used to execute and develop the computer-executable process steps, according to one aspect of the present invention. As shown in FIG. 1A, computing system 110 includes a central processing unit (CPU) 111 for executing computer-executable process steps and interfaces with a computer bus 112. In one aspect, a Pentium® class or other similar processor may be used.

Also shown in FIG. 1A are a display device interface 113, a keyboard interface 114, a pointing device interface 115, and a storage disk 116. Display device interface 113 operationally couples a monitor or other display device to system 110. Keyboard interface 114 operationally couples a keyboard or other input/output devices to system 110, and pointing device interface 115 couples a pointing device (mouse) to system 110.

Disk 116 stores operating system program files, application program files, computer-executable process steps as described below, and other files. Some of these files are stored on disk 116 using an installation program. For example, CPU 111 executes computer-executable process steps of an installation program so that CPU 111 can properly execute the application program.

Random access memory ("RAM") 117 also interfaces to computer bus 112 to provide CPU 111 with access to memory storage. When executing stored computer-executable process steps from disk 115, CPU 111 stores and executes the process steps out of RAM 117.

Read only memory ("ROM") 118 is provided to store invariant instruction sequences such as start-up instruction sequences or basic input/output operating system (BIOS) sequences.

Figure 1B:
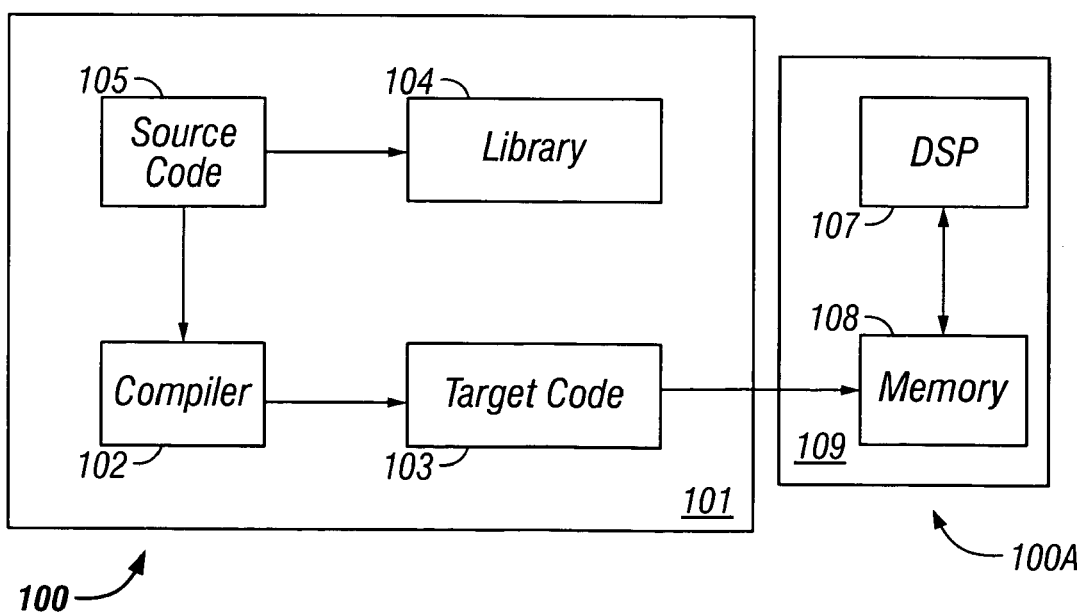
FIG. 1B is a block diagram of a system used for developing program instructions, according to one aspect of the present invention.

FIG. 1B is a block diagram of system 100 that facilitates execution of target code 103 by a target system 100A. It is noteworthy that target code 103 may be developed and executed by System 110. System 100 is preferably developed and implemented as one or more stored program executed by a general-purpose digital computing device (System 110), as described above with respect to FIG. 1A.

A programmer inputs various instructions using system 100 to generate source code 105. A programmer may enter the instructions using a conventional text editor that allows entry, display, retrieval and storage of data (system 110). Compiler 102 generates the object code (executable code) (target code 103) using one or more library 104.

Target system 100A includes a processor 107 that may be a DSP chip operationally coupled to local memory 108. Target system 100A typically also includes one or more input and output devices (not shown). DSP 107 retrieves target code 103 from memory 108 and executes target code 103, per programmer defined sequences.

Figure 2:
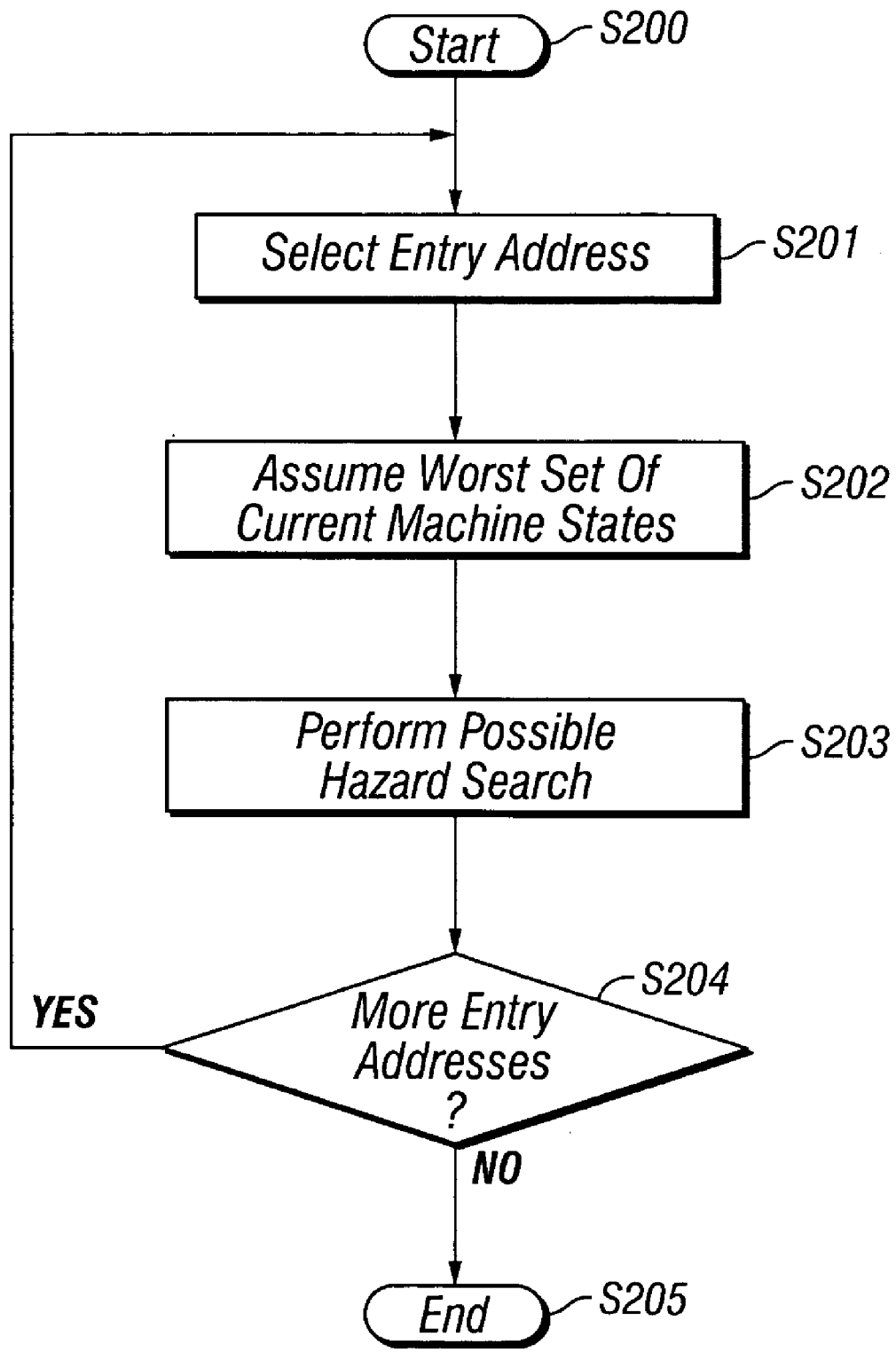
FIG. 2 is a flow diagram of computer-executable process steps for detecting program hazards in processors with unprotected pipelines, according to one aspect of the present invention.

FIG. 2 is a flow diagram of computer-executable process steps for analyzing the executable image (.exe., .file) of a computer program to avoid program hazards, which is particularly useful in processors having unprotected pipelines (like DSPs).

The process selects an entry address (an executable portion of a program) and assumes the worst set of machine states (also referred to herein as processor states). The process then performs a "depth first" search for possible hazards, assuming known and unknown hazards. The process continues until all entry addresses have been searched for possible hazards. It is noteworthy that the process is not limited to a depth first search, other search techniques may be used to search for possible hazards.

Turning now in detail to FIG. 2, in step S200, the process begins. Target code 103 is received with executable program instructions.

In step S201, an entry address of the program is chosen. An entry address is an executable part of a program from where the program or a certain portion of a program starts.

In step S202, the process assumes the worst set of possible machine states and determines possible hazard paths.

In step S203, all program paths under an entry address are searched for possible hazards. Every control path is analyzed. A more detailed description of the search under step S203 is provided below with respect to FIG. 3.

In step S204, the process determines if there are other entry addresses that must be analyzed. If there are other entry addresses, the process goes back to step S201, or else the process ends at step S205.

Figure 3:
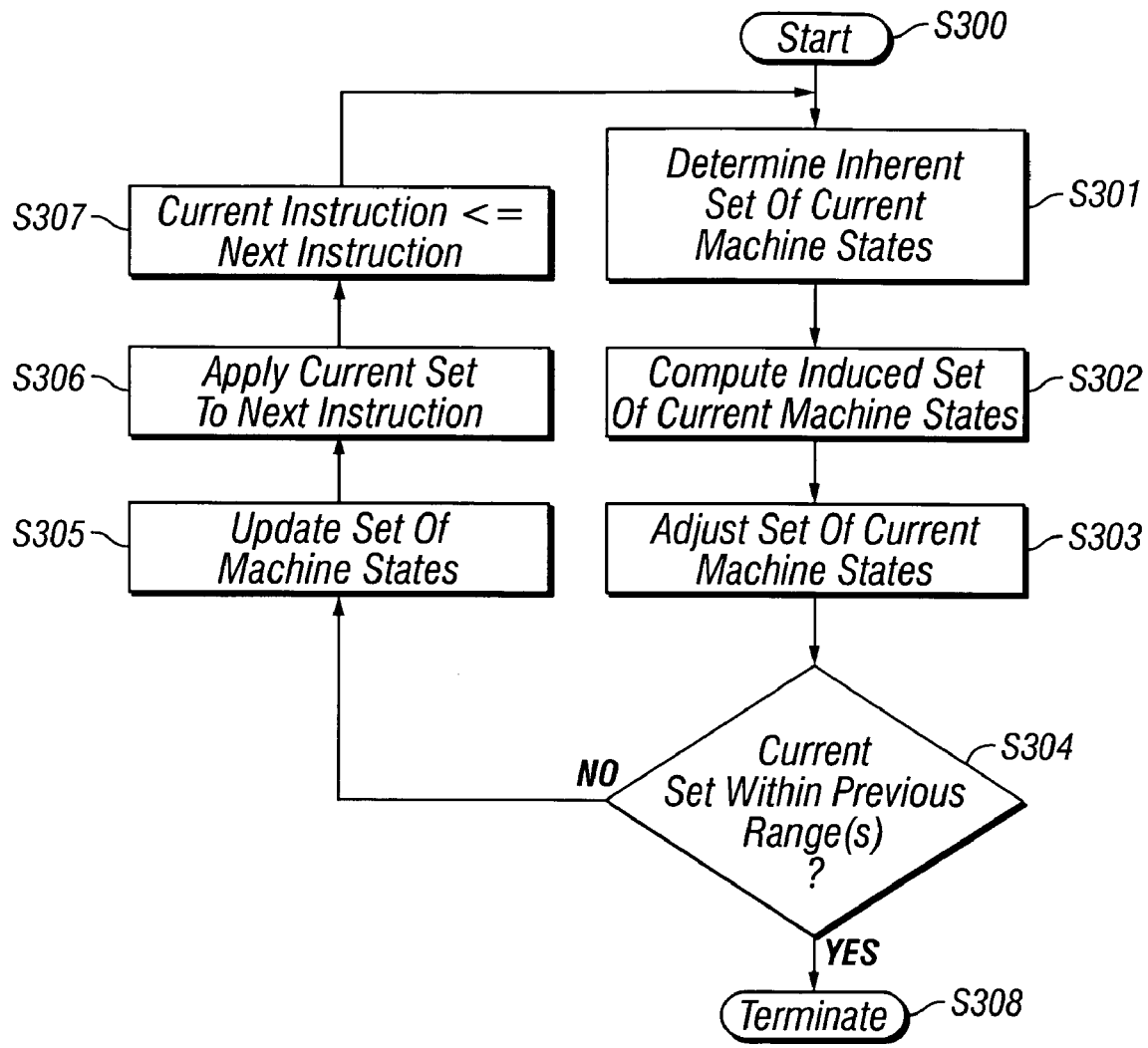
FIG. 3 is a flow diagram of computer-executable process steps for conducting a search of executable computer code, according to one aspect of the present invention.

FIG. 3 is a flow diagram of computer-executable process steps for searching possible hazards in executable program paths, in one aspect of the present invention. In one aspect, the FIG. 3 process analyzes plural control paths for possible hazards by computing an induced set of processor states after executing computer instructions; and adjusts the worst set of current processors based on program annotations to the computer instructions. An induced set of processor state at a give time includes processor states due to previously executed program sequence.

The process also determines if the adjusted set of current machine states is within a previously determined set of processor states; and updates the computed induced set of processor states associated with the instruction, if the adjusted set of current processor states is different from the previously determined set of processor states.

Turning in detail to FIG. 3, in step S300, the depth first hazard search begins.

In step S301, the process determines the inherent set of machine states at a given program branch point. A programmer may define the number of machine states by instruction code. Examples of processor states are: single mode, dual mode, value of loop register (Harvard Loop), I/O mode register and the value in the I/O mode register.

In step S302, the process determines the induced set of processor states after executing the computer code instruction, under a specific branch point of an entry address. An example of step S302 is discussed below with respect to FIG. 4. An induced set of processor states at a given time are based upon previous processor states and occur due to execution of program instruction at the given time.

In step S303, the process adjusts the set of current processor states based on a programmer's annotation to the computer code executed in step S302.

In step S304, the process determines if the current set of processor states is similar to the set of processor states during any previously conducted depth first searches. This allows the current set of processor state(s) to be compared to historical hazard data, if any. Such data may be stored in memory (e.g., disk 116).

In step S305, the computed set is updated, if the set in step S304 is not covered by historical data.

If the computed set is within the historical set, then in step S308, the search is terminated for the specific branch.

In step S306, the computed set of machine state is applied to the next instruction set within the entry address.

In step S307, the process determines if the current set of processor states is different than the set in next instruction step. If it is then the process steps S302 to S307 are repeated, or else the process terminates as in step S308.

Various hazards may be detected under the foregoing process steps of the present invention. Examples of such hazards, without limitation, include, flow hazards, loop back hazards, or read after write hazards. One skilled in the art can appreciate that the foregoing process steps are not limited to any specific hazard, and the foregoing list is only to illustrate the adaptive nature of the present invention.

Figure 4:
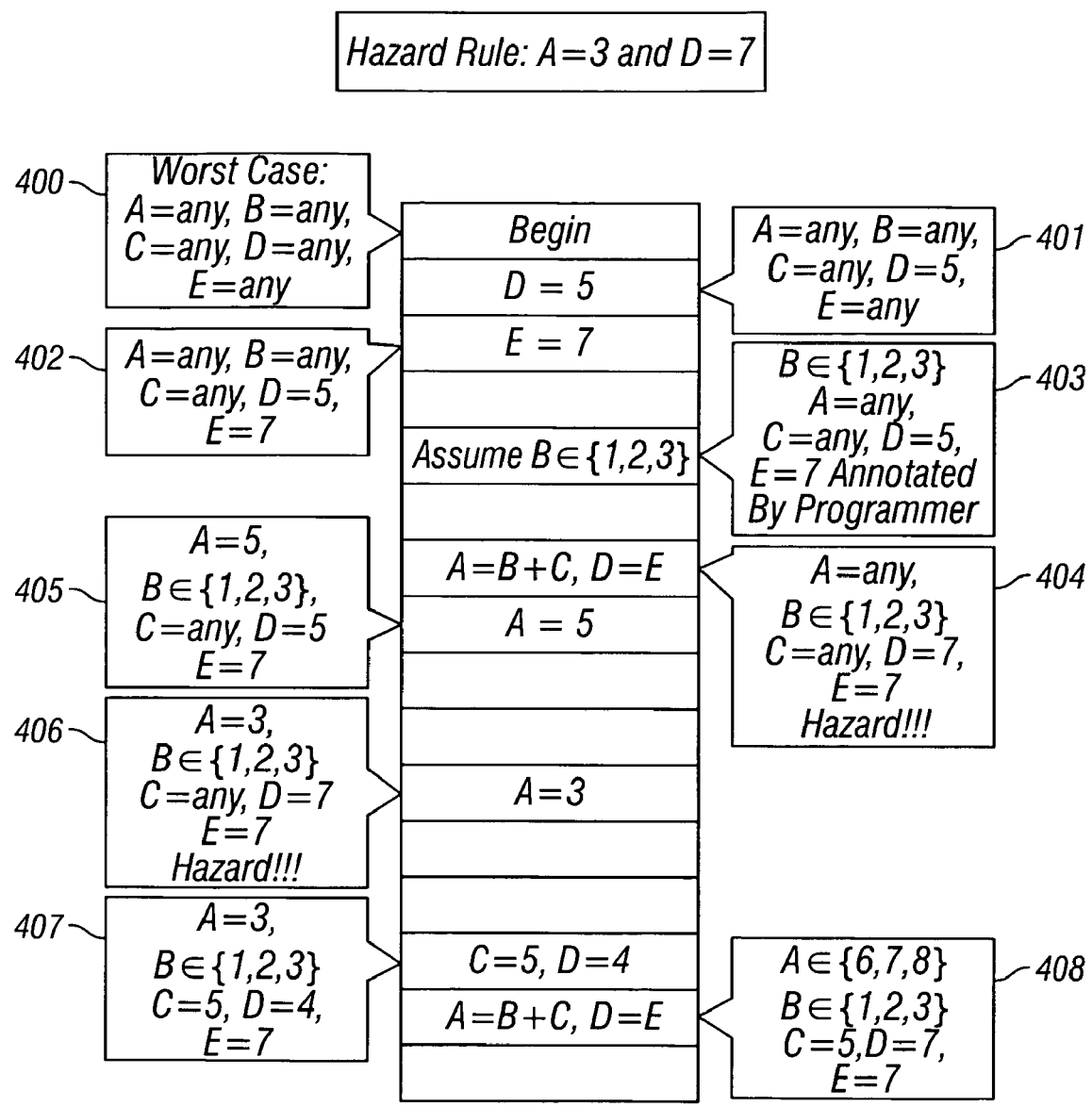
FIG. 4 shows an example for executing the various process steps of FIGS. 2 and 3.

FIG. 4 provides an illustration for implementing some of the process step of FIGS. 2 and 3. The FIG. 4 example is based on registers A through E (not shown) operationally coupled to processor 107 (or CPU 111). It is noteworthy that the number of registers is merely to illustrate the adaptive aspects of the present invention and not to limit the invention.

Processor 107 design defines a hazard rule. In this example, a hazard occurs if the values of register A and D are equal to 3 and 7, respectively.

The process begins after an entry address is selected (step S201). The worst set of machine states 400 is assumed to be any value for registers A through E (S202).

The first computer instruction 401 assigns a value of 5 for register D and any value for registers A, B, C, and E.

The next instruction 402 assigns a value of 7 for register E.

The next instruction 403 includes an annotation in the instruction, which states that the value of register B may be 1, 2 or 3.

The next instruction 404 assigns a value for register A to be equal to the sum of registers B and C, and the value of D and E as 7. In this situation, a hazard occurs, if A is equal to 3 and D is equal to 7, per the foregoing rule (A=3 and D=7).

The next instruction 405 assigns a value of 5 for register A, while B may be equal to 1, 2 or 3. C may have any value, and D is equal to 5, while E is equal to 7.

The next instruction 406 again may cause a hazard because A is equal to 3 and D is equal to 7.

Based on the foregoing instruction, a programmer can infer that no hazard will occur if A is equal to 3, and D is equal 4, while B may be 1, 2 or 3, C is equal to 5 and E is equal to 7 (Instruction 407).

The set 408 (step S302) based on the foregoing instructions and annotations when no hazards will occur is given as:
A∈{6,7,8}
B∈{1,2,3}
C=5, D=7
E=7

Computed set 408 is compared to a historical set of values for this instruction and the process steps from S304 of FIG. 3 are executed.

In one aspect of the present invention, simulation is not required and every possible executable branch is analyzed for hazards and stalls.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed:

1. A method for analyzing executable portion of computer code for processors with unprotected pipelines, comprising:
    assuming a worst set of current processor states for a processor with unprotected pipelines;
    analyzing plural control paths for possible hazards by computing an induced set of processor states after executing a computer instruction; and
    adjusting the worst set of current processor states based on program annotations to the computer instruction.

2. The method of claim 1, further comprising:
    determining if the adjusted set of current machine states is different from a previously determined set of processor states; and
    updating the computed induced set of processor states associated with the instruction, if the adjusted set of current processor states is different from the previously determined set of processor states.

3. The method of claim 2, further comprising:
    using the computed set of processor states for determining hazards in another computer instruction.

4. A computer-readable medium storing computer-executable process steps of a process for use in a computer system for analyzing executable portion of computer code for processors with unprotected pipelines, comprising:
    assuming a worst set of current processor states;
    analyzing plural control paths for possible hazards by computing an induced set of processor states after executing a computer instruction; and
    adjusting the worst set of current processor states based on program annotations to the computer instruction.

5. The computer readable medium of claim 4, further comprising:
    determining if the adjusted set of current machine states is different from a previously determined set of processor states; and
    updating the computed induced set of processor states associated with the instruction, if the adjusted set of current processor states is different from the previously determined set of processor states.

6. The computer readable medium of claim 4, further comprising:
    using the computed set of processor states for determining hazards in the next computer instruction.

7. Computer-executable code for analyzing executable portion of computer code for processors with unprotected pipelines, comprising:
    assuming a worst set of current processor states;
    analyzing plural control paths for possible hazards by computing an induced set of processor states after executing a computer instruction; and adjusting the worst set of current processor states based on program annotations to the computer instruction.

8. Computer-executable code of claim 7, further comprising:
    determining if the adjusted set of current machine states is different from a previously determined set of processor states; and
    updating the computed induced set of processor states associated with the instruction, if the adjusted set of current processor states is different from the previously determined set of processor states.

9. Computer-executable code of claim 7, further comprising:

using the computed set of processor states for determining hazards in another computer instruction.

10. A system for analyzing executable portion of computer code, comprising:

a processor that analyzes plural control paths for possible hazards by computing an induced set of processor states after executing a computer instruction; and adjusting a set of current processor states based on program annotations to the computer instruction.

11. The system of claim 10, wherein the processor
determines if the adjusted set of current processor states is different from a previously determined set of processor states; and
updates the computed induced set of processor states associated with the instruction, if the adjusted set of current processor states is different from the previously determined set of processor states.

12. The system of claim 10, wherein the processor uses the computed set of processor states for determining hazards in another computer instruction.

* * * * *